(12) United States Patent
Russell et al.

(10) Patent No.: US 11,272,696 B2
(45) Date of Patent: Mar. 15, 2022

(54) PROGRAMMABLE FISHING ROD VIBRATOR WITH SENSORY FEEDBACK CONTROLLER

(71) Applicants: Jeffrey Lucas Russell, San Rafael, CA (US); Alexander Jackson Russell, Nyon (CH)

(72) Inventors: Jeffrey Lucas Russell, San Rafael, CA (US); Alexander Jackson Russell, Nyon (CH)

( * ) Notice: Subject to any disclaimer, the term of this patent is extended or adjusted under 35 U.S.C. 154(b) by 379 days.

(21) Appl. No.: 16/432,190

(22) Filed: Jun. 5, 2019

(65) Prior Publication Data

US 2020/0060250 A1 Feb. 27, 2020

Related U.S. Application Data

(60) Provisional application No. 62/722,875, filed on Aug. 25, 2018.

(51) Int. Cl.
| | |
|---|---|
| *A01K 91/06* | (2006.01) |
| *A01K 87/00* | (2006.01) |
| *A01K 85/01* | (2006.01) |
| *A01K 97/10* | (2006.01) |

(52) U.S. Cl.
CPC ............ *A01K 91/065* (2013.01); *A01K 85/01* (2013.01); *A01K 87/007* (2013.01); *A01K 97/10* (2013.01)

(58) Field of Classification Search
CPC ............................... A01K 91/065; A01K 7/007
USPC .......................................................... 43/19.2
See application file for complete search history.

(56) References Cited

U.S. PATENT DOCUMENTS

| | | | | | |
|---|---|---|---|---|---|
| 2,624,145 | A | * | 1/1953 | Wehn ..................... | A01K 85/01 43/17.1 |
| 2,746,198 | A | * | 5/1956 | Smith .................. | A01K 91/065 43/19.2 |
| 2,783,576 | A | * | 3/1957 | Filut .................... | A01K 91/065 43/19.2 |
| 3,001,317 | A | * | 9/1961 | Boughton .............. | A01K 97/10 43/19.2 |
| 3,789,534 | A | * | 2/1974 | Yankaitis ............. | A01K 91/065 43/19.2 |
| 4,084,342 | A | * | 4/1978 | Philip .................. | A01K 91/065 43/19.2 |
| 4,349,978 | A | * | 9/1982 | Philip .................. | A01K 91/065 43/19.2 |
| 4,420,900 | A | * | 12/1983 | Nestor ................. | A01K 91/065 43/17 |
| 4,528,767 | A | * | 7/1985 | Smith, Jr. ............ | A01K 91/065 43/19.2 |

(Continued)

FOREIGN PATENT DOCUMENTS

| | | | | |
|---|---|---|---|---|
| FR | 2608371 A1 | * | 6/1988 | .......... A01K 91/065 |
| GB | 2241140 A | * | 2/1991 | |

*Primary Examiner* — Christopher P Ellis

(57) ABSTRACT

A fishing rod vibration system, including a mounting platform, a batter powered electronics system mounted on the mounting platform and including a motor controller and a user interface operably and electrically coupled to the motor controller, as well as a vibrator selectively and detachably coupled to the electronics system for receiving output signals from the motor controller. The vibrator includes a housing enclosing an electric motor, and vibrator mounting elements enable attachment of the vibrator to a fishing rod.

16 Claims, 5 Drawing Sheets

(56) References Cited

U.S. PATENT DOCUMENTS

| | | | | |
|---|---|---|---|---|
| 4,700,501 A | * | 10/1987 | Bryan | A01K 91/065 43/19.2 |
| 4,821,448 A | * | 4/1989 | Lindaberry | A01K 91/065 43/19.2 |
| 5,036,616 A | | 8/1991 | Wilsey | |
| 6,220,538 B1 | * | 4/2001 | Durso | A01K 91/065 242/250 |
| 6,363,650 B1 | | 4/2002 | Beeler | |
| 6,785,998 B2 | | 9/2004 | Seidler | |
| 6,836,995 B1 | * | 1/2005 | Zernov | A01K 91/065 43/19.2 |
| 6,910,294 B1 | | 6/2005 | Talbert | |
| 6,920,714 B1 | * | 7/2005 | Modglin | A01K 91/065 43/19.2 |
| 7,093,387 B1 | * | 8/2006 | Spencer, Sr. | A01K 87/007 43/19.2 |
| 8,176,673 B2 | * | 5/2012 | Bruell | A01K 91/065 43/19.2 |
| 8,312,669 B2 | | 11/2012 | Thomas | |
| 8,359,781 B2 | | 1/2013 | Mancuso | |
| 8,453,371 B1 | | 6/2013 | Sullivan | |
| 9,032,660 B2 | | 5/2015 | Vanacore | |
| 9,179,657 B1 | | 11/2015 | Winter | |
| 2002/0104250 A1 | | 8/2002 | West | |
| 2004/0025402 A1 | * | 2/2004 | Seidler | A01K 87/007 43/19.2 |
| 2006/0248778 A1 | | 11/2006 | Ward et al. | |
| 2014/0208631 A1 | * | 7/2014 | Teegarden | A01K 91/065 43/43.13 |
| 2019/0000049 A1 | * | 1/2019 | Bonutti | A01K 73/10 |

\* cited by examiner

PROGRAMMABLE FISHING ROD VIBRATOR WITH SENSORY FEEDBACK CONTROLLER

CROSS REFERENCES TO RELATED APPLICATIONS

The present application claims the benefit of U.S. Provisional Patent Application Ser. No. 66/722,875, filed Aug. 25, 2018 (25 Aug. 2018).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The present invention relates most generally to fishing rods and reels, and more particularly to lure vibrating and jigging devices and other forms of biomimicry employed in fishing, and still more particularly to a programmable electronic fishing rod vibration device for transmitting vibration through a fishing rod to a fishing line and lure submerged in, or floating on, a body of water, or for vibrating a fishing rod in an electronically controlled manner to have an intended effect on casting, retrieving, or any aspect of a fishing technique. The vibration profile may be tuned to induce a desired line behavior so as to increase casting distance, increase the effectiveness of a lure, minimize accumulation of water and ice on fishing equipment, or to attract fish to vibrations originating at the line itself.

Discussion of Background Art

Natural bait, and artificial fishing lures are known. Among them, in a non-exhaustive list, are such devices as saltwater fishing lures, freshwater fishing lures, trolling lures, casting lures, soft plastic baits, stick baits, leeches, goby baits, drop shot baits, tube baits, soft body frogs, lizards, spider jigs, crustacean imitations, creature baits, grubs, jerk baits, hard plastic baits, topwater baits, walking baits, crankbaits, rip baits, lipless crankbaits, spy baits, blade baits, ice jigs, tail spinners, underspins, swimbaits, glide baits, hollow body frogs, lures with blades, chatterbaits, buzz baits, umbrella rigs, inline spinners, bass fishing jigs, bucktail jigs, poppers, lures with propellers, twitch baits, wake baits, spinner baits, swimbaits, spoons, decoy fish, artificial worms, and flies. Many others will come to mind in experienced anglers. Indeed, many such devices are one of the earliest and simplest known types of biomimicry employed in fishing. The operative principle is to introduce a live bait, nonliving bait, or object such as an artificial lure in water sufficiently imitative of the prey of a fish, or imitative of a creature a fish may bite for any reason, in appearance, profile, motion, or sound or all four, so as to induce a predatory response or any other response in the form of a strike or bite involving the object being grabbed by a fish, from fishes that are feeding or holding in a body of freshwater, brackish water, or saltwater for any reason.

It is well known to manually "jig" a rod up and down or back and forth or both in a manner shown to be effective for imparting lifelike or otherwise attractive display of a particular bait for the particular species of fish sought. As used herein, the terms "jig" and "jigging" may refer to any of a number of purposeful movements that include twitch, yank, jerk, sweep, wiggle, and so forth. The movements themselves may be sufficient to increase the likelihood of a strike, but the movements may also combine with lure appearance and structural elements to produce noises or water vibrations that better mimic the particular prey of particular predatory fishes. Early jigging was practiced by handlining, without even the benefit of a reel and rod, thus the range of movements that could be applied to a lure or bait was far more limited.

Avid anglers are constantly seeking improvements in such artificial lures, and that search led to the relatively recent development of passive vibrating jigs and lures. For instance, vibrating bladed jigs, commonly referred to as chatterbaits, have been introduced in the fishing market with configurations adapted for effective casting and retrieving. When reeled in, such lures may produce vibrations with vibrating metal blades like a spinnerbait. The blades can produce vibrations involving a clicking sound, the combination of which is effective when fishing in low visibility waters, when fishes rely primarily on the mechanoreceptive capacities of the octavolateralis system for detection rather than sight.

Several electric or mechanically powered actively vibrating lures have also been developed. The first of which the present inventor is aware is shown in U.S. patent application Ser. No. 09/906,942 (Pat. Publ. No. 2002/0104250) by West, which teaches an oscillating plug-type fishing lure having a body with a housing portion enclosing a battery-operated oscillating motor. The lure includes a preprogrammed microprocessor operable to effect intermittent and alternate operation of the motor.

U.S. Pat. No. 6,910,294, to Talbert, also teaches an intra-fishing lure "animator" that includes a battery powered vibrator installed in a lure housing, and having a programmable controller electrically connected between the vibrator and the electrical power source to animate the fishing lure by actuating the vibrator.

U.S. Pat. No. 9,032,660, to Vanacore, discloses a vibrator mountable on and/or attached to the outside of a fishing lure, rather than being contained within a lure cavity or housing.

U.S. Pat. No. 8,312,669, to Thomas, describes a fishing lure containing a sound module which broadcasts an actual or simulated recorded bait creature sound from a replicated bait creature body lure in the water. The sound is produced by a sound module inside the lure via a micro speaker communicating with a microchip having the recorded actual or simulated sound of the bait creature which is broadcast through the micro speaker when activated by a motion sensing device activated by tugging on the fishing line attached to the lure, which also imparts a movement to the lure. A later patent to the same inventor, U.S. Pat. No. 8,950,105, includes motors in the lure for simulating prey animal motions.

U.S. Pat. No. 8,359,781, to Mancuso, teaches an electronic fishing lure that closes a circuit upon being submerged in water to trigger two phases of operation to attract predatory fish to a simulated prey animal. Sensors detect when the lure is submerged. In the first phase, electronic impulse energy is emitted in a waveform that simulates an initial injury to a wounded prey animal. The second phase then begins, wherein a motor causes vibrations that simulate the resulting distress and escape attempt of the prey animal.

However, as will be immediately appreciated, by even a cursory review of the foregoing patents, installing active components in a lure itself renders the lure both expensive and heavy. As to weight, such a lure is inherently heavy and may have sinker characteristics that cause the lure to move through the water in an undesirable manner. Lures are meticulously crafted to behave a certain way, including floating, suspending in the water column, or sinking. By including electronics in the lure, you are sacrificing valuable space that could otherwise be used to achieve the aforementioned characteristics. While undesired sinking characteristics can be offset with buoyancy compensation structure, the increased size and complexity of the structure may have an adverse impact on effectiveness. As to cost, vibration-producing mechanisms increase lure expense several fold, making lure loss highly undesirable. Lure loss is a common event in many types of fishing, as an unresolvable snag or a formidable fighting fish can snap a line and leave an angler with a broken line, leaving hazardous materials in the natural environment. Use of expensive electronic rigging is therefore a limitation, along with the disadvantageous performance impact of excess weight and size. It would be desirable to have means to produce sound and vibration, therefore, without having to install a vibrating mechanism in the lure itself.

When a need for a small lure arises, there are inherent space constraints. They simply cannot be too large, otherwise they do not match the size of an organism a fish may naturally consume. When electronics are housed inside a lure, the space that such electronics consume inside a lure cavity consumes space that could be better used to enhance the performance of the lure. In order to make the most effective lure, which often means the most realistic lure, the limited space inside the lure must be used to optimize its design in terms of weight distribution, buoyancy, sound production, and durability. Internal electronics compromise effectiveness by negatively affecting the way the lure moves through the water, especially when the electronics are not in use.

Although not identical to applying vibrations with a vibrating mechanism, manual jigging is the alternative to active lures. However, jigging is both tiresome and tedious, and fishermen are challenged in doing it skillfully enough to be truly effective. To enhance the efficacy and reduce the tedium of jigging, mechanized and automated jigging devices have been developed to move the fishing rod, and thus the lure directly through rod movement.

Several prior art patents bear mention in teaching clever solutions to the problem of automating jigging actions. Exemplary among them are:

An early expression in the art, namely, U.S. Pat. No. 5,036,616, to Wilsey, which teaches a fish bait jigger that imparts motion to the bait using an eccentric roller over which fishing line is threaded. The eccentric roller is connected to a small battery powered motor mounted in a housing attached to the fishing pole or the like. The housing is located between the stored supply of fish line and the bait. The eccentricity can be varied by adjusting an off center axis for the eccentric roller.

U.S. Pat. No. 6,363,650, to Beeler, which shows a fishing rod holder and jigging apparatus with a cradle for loosely supporting a fishing rod, and a jigging device attached to the cradle for jigging a fishing line. The cradle provides a stationary support for the fishing rod. A jigging device with a motor and a drive wheel are operatively connected to a fishing line striker. The fishing line striker and drive wheel are arranged such that the fishing line striker flops from a laid-back position into engagement with the fishing line as the striker rotates over its pivot axis during wheel rotation. An eyelet guide secured to a jigging device adjacent the drive wheel guides the fishing line into a path of the fishing line striker.

U.S. Pat. No. 6,785,998, to Seidler, describes a vibrating fishing rod having a vibratory module mounted within the rod handle. The vibratory module is accessible through an end opening in the handle cavity. A switch is located in the fore grip, and an electric motor and eccentric weight in the vibratory module are activated in response to actuation of the switch. When applying vibrations is desired, the fisherman is limited to use of only the rod in which the vibrator is installed, and that rod may not be well-suited for use with all the techniques and lures the fisherman may want to try. Indeed, as a practical matter, many anglers bring and frequently switch between multiple rods during an outing. Further, the location of the vibrator cannot be adjusted, the battery cannot be charged with USB, the size of the motor is limited to those small enough to fit inside the rod, and the motor switch is located on and incorporated in the fishing rod. Though a retrofit option is mentioned, Seidler's device is especially adapted for use in fishing rods initially constructed to include the vibratory module. The vibrations contemplated by Seidler are further non-tunable and don't account for custom profiles based on target species of fish and fishing conditions. Finally, the vibrator of Seidler does not produce constant vibration, but only pulsed vibration.

U.S. Pat. Appl. Pub. No. 2006/0248778, by Ward et al., discloses an automated jigging apparatus including a base on a support surface, again entirely removed from the fisherman's hands. An arm is pivotally connected to the base and includes an adjustable fishing pole engaging element enabling the operator to adjust the angle for orienting a fishing pole. The arm is pivoted mechanically through a range selected and adjusted by the user. It may include an assembly for automatically disengaging the assembly for pivoting the arm in response to a downward force exerted by a fish upon the fishing pole and an assembly for jerking a line portion of the fishing pole upward in response to a downward force exerted by a fish upon the fishing pole.

U.S. Pat. No. 6,836,995, to Zernov, teaches a fishing rod with a motorized vibrator secured to a floating rod blank. The rod blank is substantially displaced from the bore of a handle. A ferrule switch mounted to a suspended portion of the handle contains a battery power source that is manipulated as a switch contact. A vibrator includes a motor and eccentric weight and is supported to the rod blank forward of the handle and vibrates the rod blank and a supported fishing line and lure.

U.S. Pat. No. 8,176,673, to Bruell, discloses a vibration device with a battery powered motor to drive an eccentric weight, and means to vary the vibration. Switching on the device causes the fishing rod to vibrate and to transmit vibrations to the line and bait or lure. The device is detachably attached to a fishing rod shaft using straps that secure the weight and motor between a pair of spaced metal or hard plastic vibration transmitting nubs.

U.S. Pat. No. 8,453,371, to Sullivan, describes a powered jigging device with a base secured to an upright support and a pole holder assembly pivotally attached to the upright support. A fishing pole is mounted in the pole attachment portion and a motor is secured to the upright support with a rotor positioned below the pivot point of the plate portion. The assembly is entirely removed from the hands of the angler. Instead, rotation of the rotor member by the motor member causes pivoting movement of the pole holder assembly through a multipivot point linkage.

U.S. Pat. No. 9,179,657, to Winter, shows a motorized jigging device having a drive wheel pivotally attached to a spool-shaped eccentric unit which supports the handle of a fishing rod. The eccentric unit is pivotally offset from the drive wheel to travel in a circular path producing a jigging movement as the rod pivots vertically on a fulcrum support. Speed is adjustable by a variable speed motor, and amplitude is adjusted by pivoting the eccentric unit attached to the drive wheel. It is very simple and can be easily used by fishermen of all ages and abilities. It can include remote control on-off switching, speed adjustment, and on-off duration setting.

As will be seen in a review of the references, many of the prior art devices mount on a deck or rest on a support affixed to ground. Many fishing techniques require anglers to keep their fishing rod in their hands at all times in order to present the bait or lure to the fish as intended (when not trolling or fishing multiple lines). When a rod in use is placed into a holder on one of the prior art jigging devices, there is a significant delay before the angler is able to respond to a strike. This delay gives the fish time to escape. Anglers often need full control of the rod and don't have time to place and remove a rod from a rod holder. The angle of the rod and the distance from the water are suboptimal with these devices, both of which influence presentation of a lure. Further, when a rod is placed in a holder, the angler can't feel bites and must monitor the rod visually to see any motions suggesting a fish is biting their bait. Especially when using lures, a split second response is necessary to set the hook in the fish's mouth, before the fish lets go of the lure. Finally, fishermen often hike long distances on rough terrain, and then along river banks and lake shores while selecting (and frequently reselecting) a good spot. The prior art devices would be inconvenient to carry, not to mention their many other drawbacks, including the difficulty or impossibility of switching between rods, poor bait mimicry, lack of tenability, lack of training characteristics, and so forth.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

As will be appreciated by a review of the above-mentioned prior art patents, known fishing rod vibrators and oscillating lures have several shortcomings. The present invention overcomes the shortcomings of each and provides a way to enhance natural human jigging movements, and to do so consistently and easily using electronic control. The programmable rod vibration system of the present invention produces vibrations in a different (superior) vibration range than those that may be induced by human jigging actions with any kind of hook-and-line tackle combinations. The programmable vibrator of the present invention vastly increases the range of lure actions achievable by enabling a user to set the waveform shape, duration, frequency and amplitude of vibration impulses. This allows the angler to finesse rod movements translated to lure movements to a greater degree, presenting the lure more subtly or robustly than otherwise possible when relying solely on human motor skills, even at low and high power settings. Because the device is mounted principally on either up-locking or down-locking reel seats, the device is universally adaptable to essentially any rod and reel.

The invention includes a vibrator powered by a battery-powered motor with a controller programmed with a range of predetermined vibration profiles that can be turned on or off at any time. It meets the needs of a much broader cohort of anglers who use a rod/reel for targeting any of a number of species, in any environmental condition, using any type of bait, lure, hook, tackle or device combined with a fishing line.

As noted, the inventive system is mounted on a fishing rod proximate the reel using reel seat structure. Specifically, a mounting bar having a curved flange slips between the top of a reel foot and into either the seat hood of a down-locking reel seat or the slip ring of an up-locking reel seat and is securely clamped into a nested fit with the reel foot.

In embodiments, one or more components of the device may be worn as a glove, bracelet, ring, or mounting component located in an accessible location for convenience and control while fishing.

In an embodiment, when powered by a battery, the switches, controls, vibrator motor, and any motion sensors may be mounted in contact with, or close proximity to, the fishing reel. So configured the additional mass added to the fishing rod/reel by the battery and all components (except for the motor) minimally affects the balance or comfort of the rod/reel combination. Mounting components of the device to and proximate the rod's reel seat enables the device to be installed nearly universally in a relatively short amount of time. Thus, anglers have the option of switching their rod/reel back to a traditional non-electric version free of any potentially performance influencing accessory while not in use or allowing them to switch the device between different rods. In alternative embodiments, the various operational components may be spaced apart optimally along the length of the rod. For instance, in embodiments the vibrator motor may be spaced distally from the reel, i.e., toward the tip of the rod. This will enhance transmission of vibrations from the vibrator to the rod and reduce vibrations at the reel.

The motorized component produces vibrations or moves a nearby component in contact with the fishing rod, reel, or line, in a way that advantageously affects the fishing lure to provide a more enticing representation of a creature to the fish, using movements and appearances not possible fishing by hand alone, as well as to alter the movement subtly or aggressively and powerfully. The device ensures lure presentation more wide ranging, more consistent and more easily replicable, particularly when compared to fishing methods in which lure movement depends on human motor skills for creating lure movement. Since the vibration impulses are controlled by program outputs that control an electric motor (rather than by a distracted, tired, forgetful person), the invention makes it possible to maintain an accurate jigging rhythm, without having committed to muscle memory that aspect of the art of fishing. Indeed it creates a method for generating new muscle memory, making it possible for fishermen to more accurately move their lure as desired, with less effort.

The present invention also expands possible ways in which a fishing rod, reel, line, and lure can be used while fishing, making possible a range and selection of lure presentations that are physically impossible to replicate using even fine human motor skills. A range of algorithms controlling the vibrator motor enable the user to rapidly change fishing lure action with the click of a button, or even to synchronize the action of the bait or lure with musical melodies and rhythms, some of which mimic or approximate those occurring in nature.

Finally, in embodiments the controller can be a network connectable device or Bluetooth enabled, such that vibration programs and profiles can be downloaded from another network connected device, such as a smart phone or tablet. With such a feature and a corresponding software application, anglers can share with one another the vibration profile they have found most successful for certain species in certain waters in certain conditions, when using certain tackle. The programmability of the system enables users to continue fine tuning the profiles until they are highly effective (meaning: consistent with the user's selection or desired profile). For example, it is entirely conceivable that rather than asking what kind of lure or bait the fish are hitting, an angler might ask what vibration profile has been found effective. As another example, rather than asking how to use a certain lure, an angler might select a vibration profile to provide the appropriate rhythmic cuing.

The invention exploits modern rod and reel design, which are often meticulously crafted to convey subtle tactile information from the end of a fishing line to the hands of a fisherman. It does so by incorporating an accessory that sends energy, vibrations, or movements in an opposing direction: i.e., away from the rod and down an extended line, without being constrained by a fisherman's coordinated muscle movements and fine motor skills (or lack thereof). The system enhances a user's ability to shift fishing styles without having to change equipment, or consciously make an effort to alter their technique.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
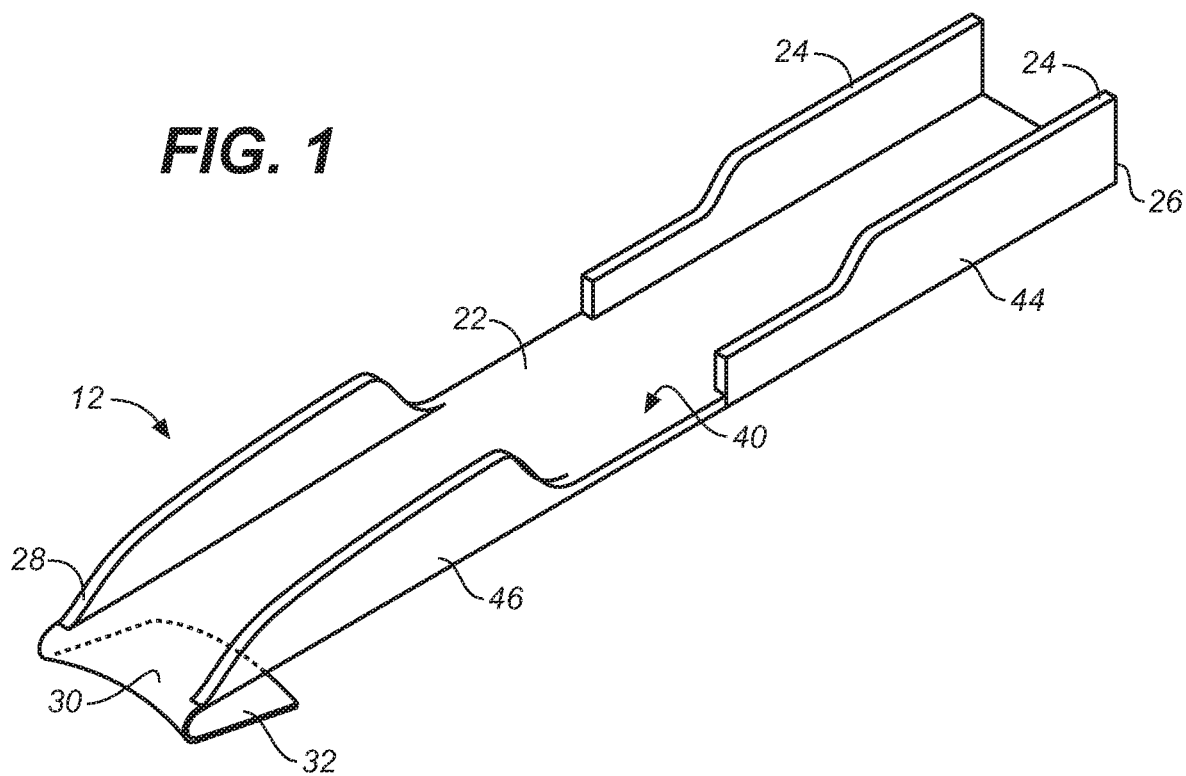
FIG. 1 is an upper perspective view of the mounting bar for mounting a housing enclosing the electronic circuitry, motor controller, and user interface of the programmable fishing rod vibrator of the present invention.

Referring to FIGS. 1 through 6, wherein like reference numerals refer to like components in the various views, there is illustrated therein a new and improved fishing rod vibrator and jigging apparatus, generally denominated 10 herein. Looking first at FIG. 1, there is shown a mounting bar 12 which attaches to an upper portion of a reel seat 14 (as described below) where the bottom end 16 of a rod blank 18 couples to a rod handle 20. Any of a number of devices may be mounted on the mounting bar, including a vibration system, but also a flashlight, radio, GPS device, fish attractant dispenser, speaker, and so forth.

Figure 2:
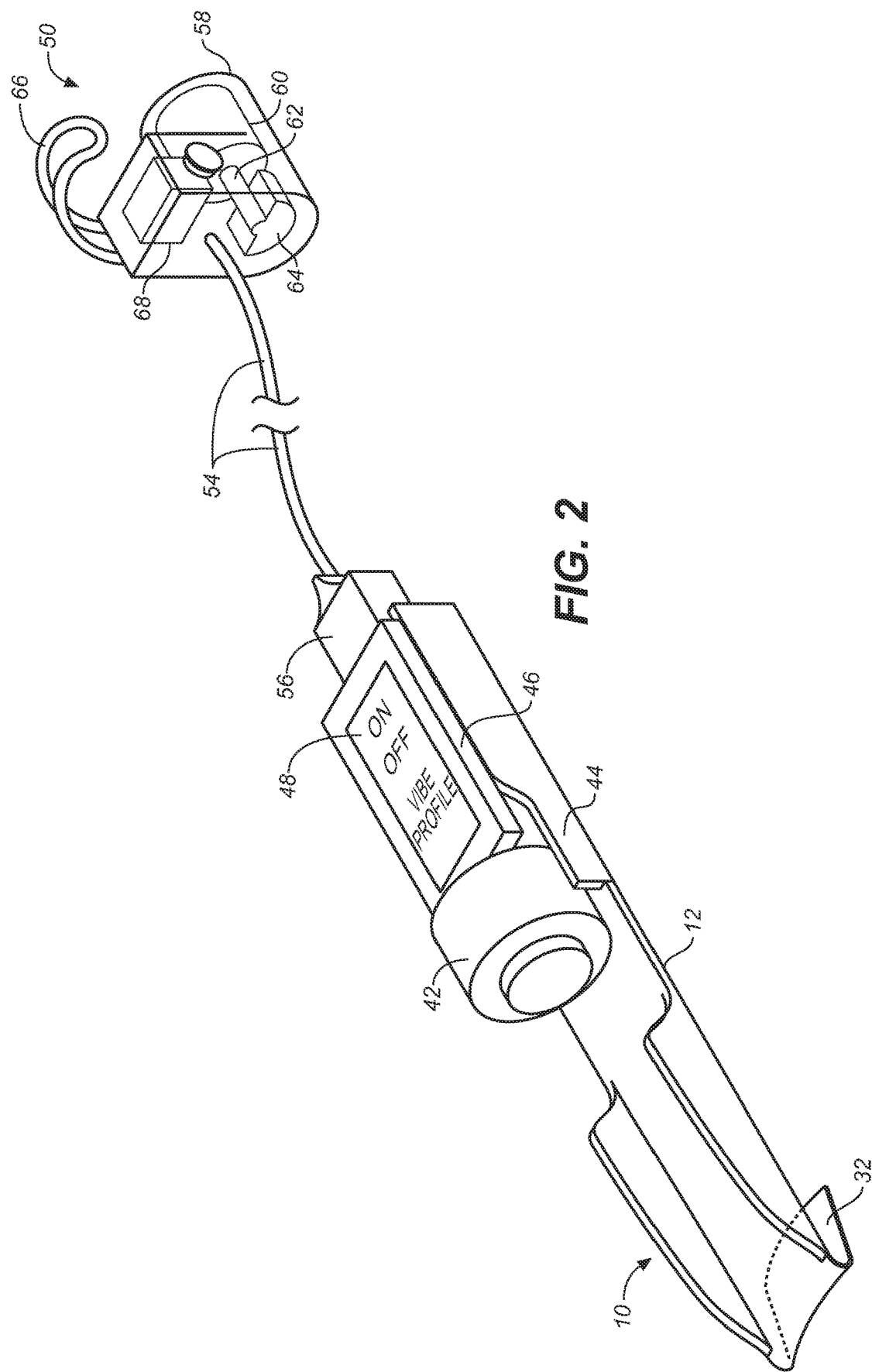
FIG. 2 is the same view showing the housing mounted on the mounted bar.
Figure 3A:
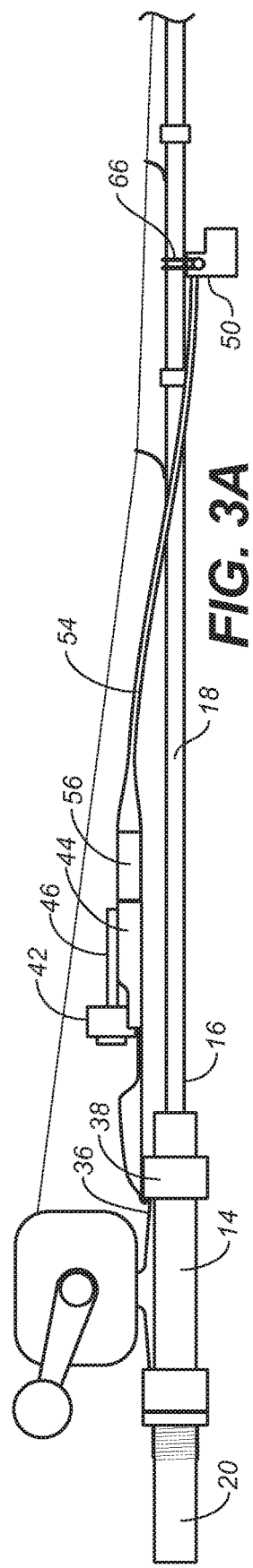
FIG. 3A is a side view in elevation showing the programmable fishing rod vibrator system installed on a fishing rod.
Figure 3B:
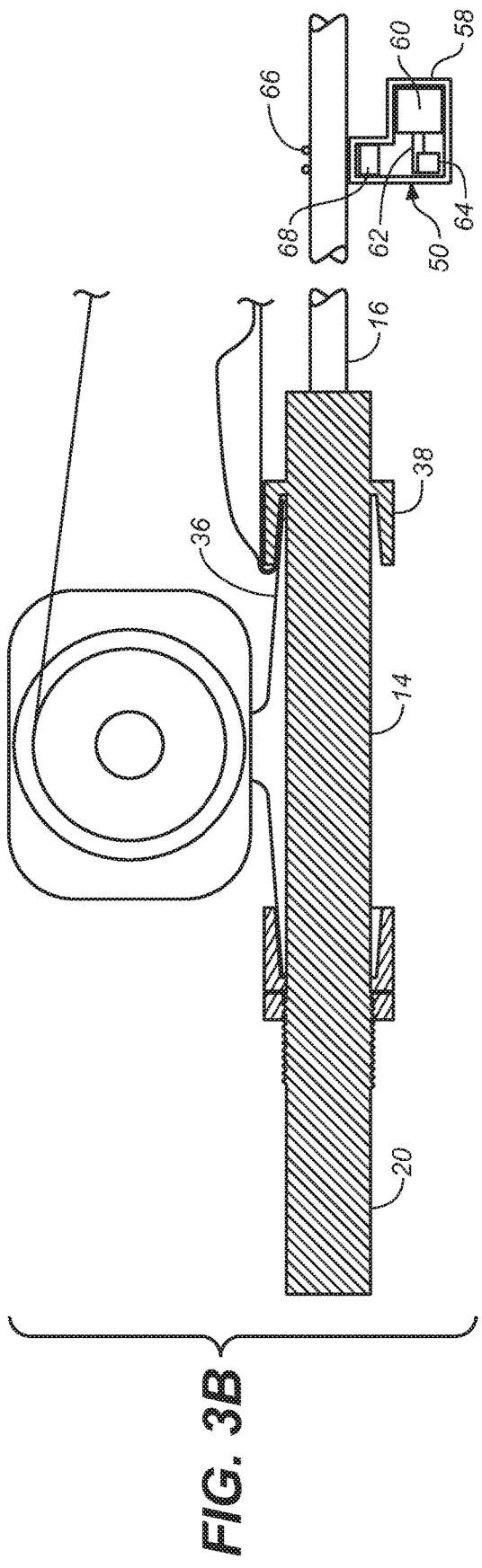
FIG. 3B is a cross-sectional side view in elevation of the mounted programmable fishing rod vibrator showing details of the mounted electronics and vibrator motor taken along section lines 3B-3B of FIG. 3A.
Figure 4:
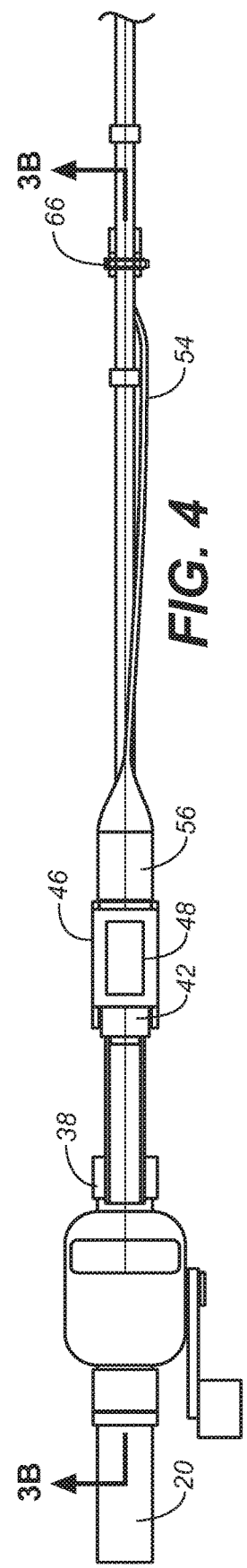
FIG. 4 is a top plan view of the system as shown in FIG. 3.

As seen in FIGS. 1-2, in embodiments the mounting bar 12 comprises a U-shaped channel with a generally planar medial platform portion 22 and structurally reinforcing side rails 24 that taper from the distal end 26 to near the proximal end 28 of the mounting bar. Variations in the rail configuration will be understood as within the scope of even this embodiment. A bend 30 is introduced into an extended finger or end portion 32 of the mounting bar to create a return flange 34, which is configured with curvature to generally match the typical curvature on the curved upper surface of a reel foot 36 and also to slip under the lip of either the seat hood of a down-locking reel seat or the slip ring 38 of an up-locking reel seat. When so positioned, it may be securely sandwiched between the reel foot and slip ring or seat hood and clamped into the reel seat along with the reel foot.

Still looking at FIGS. 1-2, in embodiments the rails may include a cut out 40 or recess to facilitate handling and fingertip access to system electronics 42 mounted on the mounting platform between the side rails on an outboard portion 44 of the mounting bar. The side bar cutout separates the outboard portion 44 of the mounting bar and the inboard portion 46 of the mounting bar.

System electronics 42 include a battery (not shown) electrically coupled to a motor controller 44, which preferably includes a PCB 46 with a microprocessor or other programmable logic electronically coupled to a user interface 48. The controller is, in turn, electrically connected to a rod-mountable vibrator 50, either wirelessly or with a wire 54 using a USB or other cable connector 56.

The vibrator includes a motor housing 58, a small electric motor 60 enclosed therein, the motor having a drive shaft 62 with weight 64 eccentrically disposed about the shaft. The upper portion of the housing includes mounting brackets 66 which clamp to the rod blank. During motor operation, the uneven weight distribution induces oscillations in the surrounding connected structures. The mounting brackets may enclose at least one motion sensor, such as a MEMS accelerometer 68, which is electrically coupled to the PCB to provide vibration feedback to the programmable controller. Alternatively, such a sensor may be located separately.

This mounting configuration is advantageous inasmuch as it provides structure on which to mount a number of accessories for a fishing rod and reel while maintaining the rod's balanced feel. Any additional weight is distributed quite close to the reel without significantly altering rod balance. Because the rod hinges around the reel during use, adding weight to this location feels essentially the same as using a heavier reel and does not change the overall experience of using the rod.

Additionally, this configuration places control right at the user's fingertips, immediately next to the user's hand location while fishing.

Further still, placement of the system electronics out of direct engagement with the rod blank ensures that only the vibrating portion of the apparatus is in contact with only the sensitive rod blank; all non-vibrating components are located elsewhere. It will be noted that this advantageous feature contrasts with prior art devices inasmuch as it enables transfer of stronger vibrations using a small motor: vibrations are not damped by co-located battery, housing, electronics, and other system components.

As will be appreciated from the foregoing, the system also includes a rod-mounted electronic control unit with a programmable controller coupled to a rod-mounted vibrator and motion sensor. The controller may be factory programmed or may be configured for user programming alone or to complement factory programming. The control unit houses the battery that provides system power to the user interface and the vibrator/sensor assembly, reads sensor data, and controls the vibration profile created by motor operation in response to user input and sensor data. While a touch screen with numerous control features may be provided, the user interface may be as simple as an on-off switch, and user inputs communicated to the controller may be made separately through a connected device having a graphical user interface, such as a smartphone.

Figure 5:
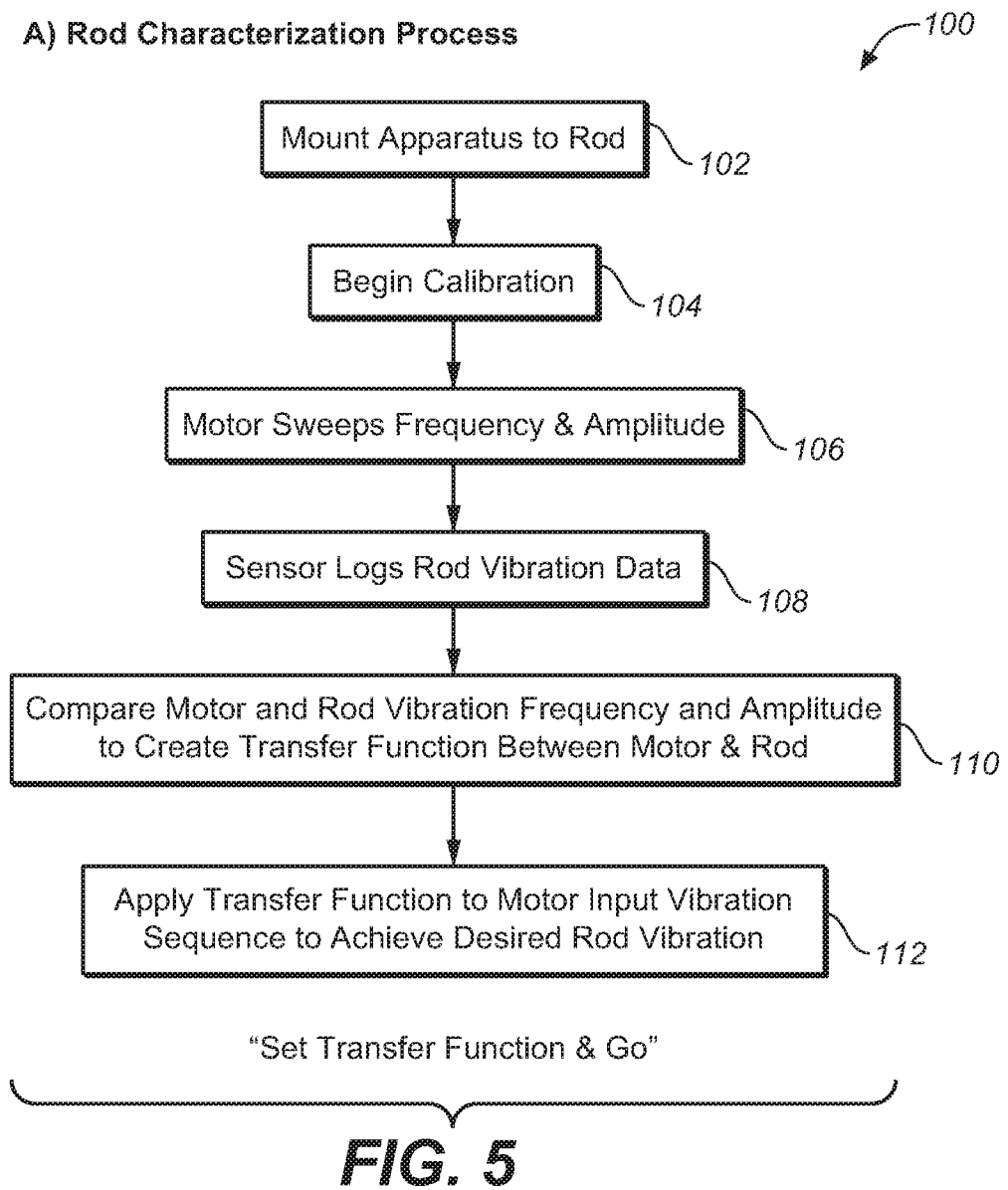
FIG. 5 is schematic flow chart showing the programming steps involved in a rod characterization process, wherein a transfer function is calculated to match rod output to predetermined desired frequencies and amplitudes.
Figure 6:
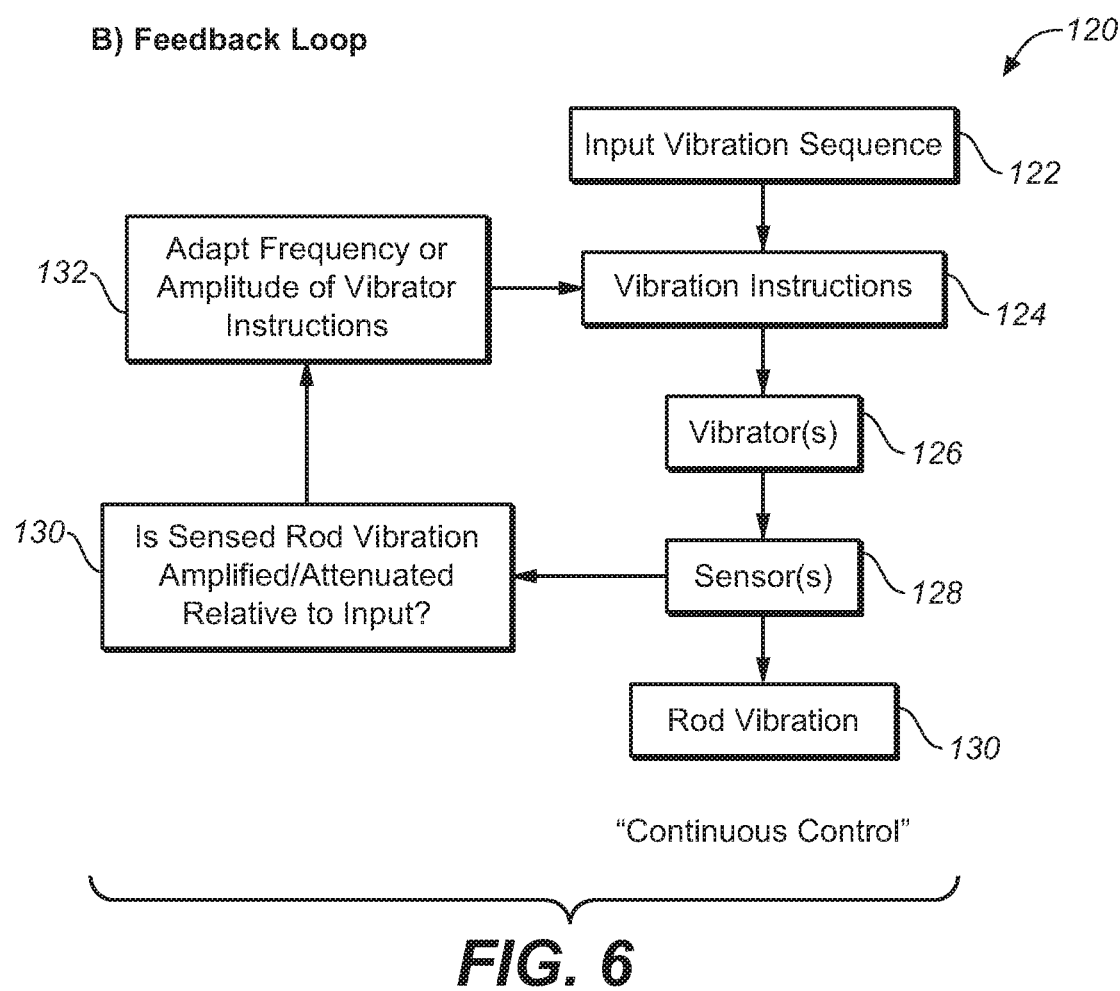
FIG. 6 is a flow chart showing programmable controller means for continuously sensing actual rod vibrations relative to vibration instruction profiles and adjusting the instructions to better match the desired output.

Looking next at FIG. 5, there is shown a process 100 for characterizing a rod after system installation. Once the programmable vibration apparatus is installed 102, a calibration step 104 is initiated by the user selecting calibration through the user interface. The controller turns on the vibrator motor and sweeps 106 through a range of predetermined vibration shapes, frequencies, and amplitudes for predetermined times, during which the motion sensor detects the rod vibrations, comparing actual vibrations to controller instruction outputs (motor inputs) 110, and then calculates and applies a transfer function 112 to reconcile controller output/motor input with sensor signals to achieve the desired (target) rod vibrations. At this point the rod is characterized for use.

During use, rod vibrations may be continually monitored and referenced to the motor input vibration sequence, such that the implied transfer function between the rod vibrations and motor input vibration sequences is continually updated. This continuous control feedback loop 120 ensures ongoing accuracy in rod vibrations so as to conform to user, the clear objective being to control vibration motor input based on actual sensed rod behavior. In this way, the user can choose how the fishing rod is vibrating by continuously controlling or applying predefined sequences and frequencies programmed to system software. This control function further enables user to maintain vibration control even when the fishing rod is in a bent configuration and its action is altered. Thus, by adjusting to changes in the fishing rod's current state—while the fishing line is taught enough for the fishing rod action to influence the behavior of the lure—the user can maintain tight control over the behavior of the lure.

Lures move and produce sounds based on their surface features (including those of operative attachments) and movement, as well as how they are presented and moved through, or on top of the water by an angler. A lure is like a musical instrument that doesn't move or produce sound unless it is "played" by the angler. The system controller gives the user an additional way to control the movement and sound of a lure by controlling the energy that travels from the vibrator through the fishing rod and line to a lure.

The system electronics may themselves be network connectable and provided with an app for downloading and uploading vibration profiles and sequences, or, more likely, the system electronics may be Bluetooth enabled or otherwise provided with means for short distance data exchange so as to receive data from and transmit data to a smart phone, fish finder, underwater speaker, or other electronics device. Thus, with others sharing vibration profile libraries, perhaps specific to fish locations, species, or behavior of the creature the lure is intended to mimic, a user may manually input or download and input in the system controller a vibration sequence 122 that causes the controller to output vibration instructions 124 to the motor. In embodiments, a user may make inputs in the field as the device is being used. The vibrator transmits its oscillations to the fishing rod 126, where the rod vibrations (shape, frequency, amplitude, duration) are picked up by the movement sensors 128, which transmits the sensor signals back to the controller, which again compares sensed rod vibration with motor inputs 130 and adjusts control inputs 132 to reconcile the inputs with the outputs so as to maintain vibration sequence fidelity. Continuous control over rod vibration is thus ongoing and maintained.

Users may select complex vibration profiles matching or otherwise providing a stimulus redolent of fish prey to lures with their characteristic aquatic movements and sounds.

As will be appreciated, the above-described controller may take a number of forms and may be implemented in a number of well-known programmable logic devices. In embodiments, the PLC may comprise a general-purpose microprocessor or microcontroller, an ASIC, a DSP, an FPGA, or another programmable logic device adapted to carry out the functions recited above. The routines and subroutines called and executed by the vibration program may be stored in any of a number of forms of electronic and digital storage media known in the art. The controller reads information from and enables writing information to memory.

As noted, the controller is preferably either network enabled or otherwise provided with circuits for data transfer using a short range communications protocol so as to facilitate digital file transfers to and from remote sources using known wireless technologies as the user engages the interface to so instruct the system.

Several kinds of vibration profiles are contemplated.

For instance, a user may employ profiles created using cadences based on a prey species, behavior, or size the targeted fish naturally consume. For instance, vibration profiles designed using the cadence of a creature's heartbeat while swimming, or the vibration and sound output created by a flying creature that has fallen into the water, such as a bug or bird. The field of bioacoustics or biotremology may be involved in creating profiles.

Moreover, there may be profiles based on the degree to which the user's technique is considered a "power" or "finesse" fishing presentation. For instance, vibration profiles may be developed for rapidly fishing a large area, and trying to get fish to bite out of reflex or aggravation, which is often performed using lures that produce a lot of vibration, targeting widely dispersed fish, a power fishing technique.

Profiles may also be developed for fishing smaller areas using a slower, often downsized natural looking lure that resembles a creature that fish naturally consume. This sometimes would be used, for instance, to catch fish known to be holding in a specific location, a finesse fishing technique.

Profiles may be developed based on the type of lure, bait, fishing line, or any specific fishing equipment. For example, distinct profiles may be developed for monofilament line, fluorocarbon line, braided line, fly fishing line, and any other type of fishing line that may sink or float, as well as profiles developed for any given strength or other fishing line properties. Profiles specific to various line types may increase cast distance and cause water to fall from the line during retrieval, thus returning to the spool of the reel with a reduced amount of water.

Next, profiles may be developed for rhythmic cuing, enabling anglers to animate the presentation of a lure by following vibrator cadence while executing controlled movements of the rod. For instance, the vibrator might pulse every three seconds, signaling the angler to twitch the rod every three seconds. Music profiles may even be developed.

Vibration profiles can be finely tuned to adjust for subtle vibration-influencing factors, such as the strength and diameter of the fishing line, the distance of a cast, lure depth, fishing rod length, gear ratio of reel, the size of a lure, trolling motor speed, etc.; or environmental factors such as water temperature, season, life history patterns of fishes, target species abundance, the average size of fishes found in the body of water the angler is fishing, variation in habitat found within the fishing location, and so forth.

Thus, as shown in the foregoing, in its most essential aspect, the fishing rod vibration system of the present invention comprises a mounting platform, a battery powered electronics system mounted on the mounting platform and including a motor controller and a user interface operably and electrically coupled to the motor controller, as well as a vibrator selectively and detachably coupled to the electronics system for receiving output signals from the motor controller, the vibrator including a housing enclosing an electric motor. Vibrator mounting elements enable attachment of the vibrator to a fishing rod.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A fishing rod vibrator, comprising:
a mounting platform configured to be captured by a reel seat;
an electronics system mounted on said mounting platform, said electronics system including a battery powered motor controller and a user interface operably coupled to said motor controller;
a vibrator selectively and detachably coupled to said electronics system for receiving output signals from said motor controller, said vibrator including a housing enclosing an electric motor; and
vibrator mounting elements to attach said vibrator to a fishing rod.

2. The fishing rod vibrator of claim 1, wherein said mounting bar comprises a distal portion for mounting said electronics system and a proximal portion for connection at or near the reel seat.

3. The fishing rod vibrator of claim 1, wherein said mounting platform is a U-shaped channel with opposing side rails normal to a generally planar to surface for containing said electronics system.

4. The fishing rod vibrator of claim 2, wherein said proximal portion of said mounting platform includes a proximal bend forming a flange oriented toward said distal end, said flange configured for insertion between the top side of a reel foot and the underside of either a slip ring of an up-locking reel seat or a seat hood of a down-locking reel seat.

5. The fishing rod vibrator of claim 1, wherein said vibrator is spaced apart from said electronics system and said mounting platform.

6. The fishing rod vibrator of claim 1, wherein said motor controller is configured to output signals to said vibrator so as to vary vibration frequency and amplitude alone or in combination.

7. The fishing rod vibrator of claim 1, wherein the possible adjustments to the vibrations produced by the vibrating component include adjustments to the wave amplitude or frequency, or any combination thereof.

8. The fishing rod vibrator of claim 1, wherein the motor control outputs signals to cause said vibrator to produce vibrations that are identical or substantially similar to a sine wave, a square wave, a pulse, a thrum, an oscillation, a ripple, or any combination thereof.

9. The fishing rod vibrator of claim 1, further including at least one motion sensor.

10. The fishing rod vibrator of claim 9, wherein said vibrator housing encloses said at least one motion sensor.

11. The fishing rod vibrator of claim 1, wherein said vibrator mounting elements are integral with said vibrator housing.

12. The fishing rod vibrator of claim 10, wherein said vibrator engages one or more of said fishing rod, fishing line, and fishing reel.

13. The fishing rod vibrator of claim 1, wherein said vibrator mounting elements include one or more magnets to affix to a ferromagnetic structure on the rod, reel, or reel seat of a fishing pole.

14. The fishing rod vibrator of claim 1, wherein said vibrator mechanically constrains the fishing line to contact with the vibrating component.

15. The fishing rod vibrator of claim 1, wherein said mounting platform attaches to a reel seat and said vibrator attaches to a position on a fishing rod distal to the reel seat.

16. The fishing rod vibrator of claim 1, wherein said electronics system includes a housing having a battery compartment for providing battery power to said motor controller, said vibrator motor, and said user interface.

* * * * *